United States Patent
Cho

(10) Patent No.: US 9,994,211 B2
(45) Date of Patent: Jun. 12, 2018

(54) METHOD FOR CONTROLLING TORQUE INTERVENTION OF HYBRID VEHICLE

(71) Applicant: Hyundai Motor Company, Seoul (KR)

(72) Inventor: Jin Kuk Cho, Goyang-si (KR)

(73) Assignee: HYUNDAI MOTOR COMPANY, Seoul, Korea (KR)

( * ) Notice: Subject to any disclaimer, the term of this patent is extended or adjusted under 35 U.S.C. 154(b) by 78 days.

(21) Appl. No.: 14/932,793

(22) Filed: Nov. 4, 2015

(65) Prior Publication Data

US 2016/0368471 A1 Dec. 22, 2016

(30) Foreign Application Priority Data

Jun. 17, 2015 (KR) .................. 10-2015-0086101

(51) Int. Cl.
*B60W 20/10* (2016.01)
*B60W 10/06* (2006.01)
(Continued)

(52) U.S. Cl.
CPC ............ *B60W 10/08* (2013.01); *B60K 6/383* (2013.01); *B60K 6/445* (2013.01); *B60W 10/06* (2013.01);
(Continued)

(58) Field of Classification Search
CPC ...... B60W 20/10; B60W 10/06; B60W 10/08; B60W 20/20; B60W 30/18172;
(Continued)

(56) References Cited

U.S. PATENT DOCUMENTS 6,460,647 B1 * 10/2002 Schmitt .................. B60K 28/16
180/197
8,577,578 B2 * 11/2013 Whitney ................. B60K 6/445
123/406.23
(Continued)

FOREIGN PATENT DOCUMENTS

JP  2004-136854 A  5/2004
JP  2008-168720 A  7/2008
(Continued)

OTHER PUBLICATIONS

Korean Notice of Allowance dated Aug. 17, 2016, issued in Korean Patent Application No. 10-2015-0086101.

*Primary Examiner* — Nga X Nguyen
(74) *Attorney, Agent, or Firm* — McDermott Will & Emery LLP

(57) ABSTRACT

A method for controlling torque intervention in a power split-parallel hybrid vehicle comprises a determination step, in which whether the torque intervention for controlling the driving force of the vehicle is requested. Upon the torque intervention request, a driver's requested torque and an intervention torque for the torque intervention are determined in a decision step. When a torque intervention request time during which torque intervention is requested is below a reference time, each of driving sources is controlled together to output the driver's requested torque plus the intervention torque as a final requested torque on the basis of a current driving mode which is maintained as a driving mode just before the torque intervention is requested.

9 Claims, 7 Drawing Sheets

(51) Int. Cl.
*B60W 10/08* (2006.01)
*B60K 6/383* (2007.10)
*B60K 6/445* (2007.10)
*B60W 30/18* (2012.01)
*B60W 20/20* (2016.01)

(52) U.S. Cl.
CPC ...... *B60W 20/20* (2013.01); *B60W 30/18172* (2013.01); *B60W 2510/244* (2013.01); *B60W 2520/28* (2013.01); *B60W 2710/0666* (2013.01); *B60W 2710/083* (2013.01); *Y02T 10/6239* (2013.01); *Y02T 10/6286* (2013.01)

(58) Field of Classification Search
CPC ... B60W 2710/0666; B60W 2510/244; B60W 2520/28; B60W 2710/083; B60K 6/383; B60K 6/445; Y02T 10/6286; Y02T 10/6239
USPC ............ 701/22, 51, 54, 99; 477/37, 3–4, 68; 180/65.21; 903/947
See application file for complete search history.

(56) References Cited

U.S. PATENT DOCUMENTS

| | | | | |
|---|---|---|---|---|
| 8,731,751 | B2* | 5/2014 | Simon, Jr. | B60K 6/48 477/3 |
| 2009/0118081 | A1* | 5/2009 | Heap | B60K 6/365 477/3 |
| 2014/0330469 | A1* | 11/2014 | Yoshida | B60W 10/06 701/22 |

FOREIGN PATENT DOCUMENTS

| | | |
|---|---|---|
| JP | 2009-234359 A | 10/2009 |
| JP | 2010-202150 A | 9/2010 |
| JP | 2011-063089 A | 3/2011 |
| JP | 2012-171593 A | 9/2012 |
| JP | 2013-139181 A | 7/2013 |
| JP | 2015-058868 A | 3/2015 |
| KR | 10-2008-0038802 A | 5/2008 |

* cited by examiner

-- Related Art --

-- Related Art --

METHOD FOR CONTROLLING TORQUE INTERVENTION OF HYBRID VEHICLE

CROSS REFERENCE TO RELATED APPLICATION

The present application claims the benefit of priority to Korean Patent Application No. 10-2015-0086101 filed Jun. 17, 2015, the entirety of which application is incorporated by reference herein.

TECHNICAL FIELD

The present disclosure relates to a method for controlling torque intervention of a hybrid vehicle. More particularly, the present disclosure relates to a method for controlling torque intervention in a power split-parallel hybrid vehicle, in which the torque intervention can be controlled without affecting vehicle operation when the torque intervention is requested in the power split-parallel hybrid vehicle.

BACKGROUND

In general, a hybrid vehicle having a power-split powertrain does not need to control torque intervention since such a hybrid vehicle does not have a fixed gear transmission system unlike a transmission mounted electric device (TMED)-type hybrid vehicle or a conventional gasoline engine vehicle. However, when a traction control system (TCS) requests the torque intervention control, the hybrid vehicle having a power-split powertrain is required to control the torque intervention to limit a tractive force of vehicle wheels.

FIG. 1 is a view illustrating a control flow in a conventional TMED-type hybrid vehicle upon a request from a TCS.

An intervention torque that is smaller than a maximum output torque of a motor, as requested by a TSC, is controlled by the maximum output torque of the motor.

When the intervention torque is larger than the maximum output torque of the motor, whether the engine clutch is engaged is checked. If the engine clutch is engaged, some of the intervention torque is controlled by the maximum output torque of the motor, and the remaining intervention torque is controlled using an engine torque.

If such a conventional torque intervention control is applied to a power split-parallel hybrid, problems in vehicle operation occur.

FIG. 2 is a view illustrating a configuration of a power split-parallel hybrid vehicle. With reference to FIG. 2, problems with the application of the conventional torque intervention control to a power split-parallel hybrid vehicle will be described. In the power split-parallel hybrid vehicle, one planetary gear set (PG) is connected to an engine (E), a first motor generator (MG1), and a second motor generator (MG2), and transmits a torque through a sun gear (S), a carrier (C), and a ring gear (R). The torque, which is applied to each of the sun gear, the carrier, and the ring gear, is determined using the following equations.

$$T_{sun} = -\frac{1}{1+R} T_{carrier}$$

$$T_{out} = \frac{R}{1+R} T_{carrier} + T_{ring}$$

$$T_{ring} = R \cdot T_{sun}$$

$$R = \frac{\#teeth_{ring}}{\#teeth_{sun}}$$

When the torque is not transmitted to each of the rotating elemental gears, not only a desired torque is not delivered to an output shaft, but also the sun gear and the carrier spin M freely.

If torque intervention is controlled by reducing a torque of the second motor generator (MG2), as in the TMED-type hybrid vehicle, an engine reaction torque from the second motor generator (MG2) and a reaction torque of the first motor generator (MG1), which is responsible for an engine speed control, are offset, thus causing a problem in operating the vehicle.

The matters described as the background arts are only intended to increase the understanding of the background of the present disclosure, but should not be recognized as being prior arts which are already known to those skilled in the art.

SUMMARY

An aspect of the present inventive concept provides a method for controlling torque intervention in a power split-parallel hybrid vehicle, in which the torque intervention can be controlled without affecting vehicle operability when the torque intervention is requested.

According to an exemplary embodiment of the present inventive concept, a method for controlling torque intervention in a hybrid vehicle comprises a determination step for determining whether the torque intervention for controlling a driving force of the vehicle is requested. A decision step, when the torque intervention is requested, determines a driver's requested torque and an intervention torque for torque intervention. A control step for controlling, when a torque intervention request time during which torque intervention is requested is shorter than a reference time, each of driving sources together to output the driver's requested torque plus the intervention torque as a final requested torque on the basis of a current driving mode in which the current driving mode is maintained as a driving mode just before the torque intervention is requested.

In the control step, when the torque intervention request time exceeds the reference time, the current driving mode is changed to a driving mode corresponding to the final requested torque while each of driving sources are controlled to output the final requested torque on the basis of the current driving mode.

The torque intervention is requested by a traction control system (TCS).

In accordance with another exemplary embodiment of the present inventive concept, a method for controlling torque intervention in a hybrid vehicle, wherein the hybrid vehicle includes a planetary gear set composed of a first, a second, and a third rotating element, the first rotating element functions as a selective fixing element connected with a first motor generator, the second rotating element is connected to an engine and rotates only in one direction, and the third rotating element is connected to a second motor generator and thus to an output shaft, comprises a determination step for determining whether the torque intervention for controlling a driving force of the vehicle is requested. A decision step determines, when the torque intervention is requested, a driver's requested torque and an intervention torque for torque intervention. A control step controls, when a torque intervention time during which the torque intervention is requested is below a reference time, each of driving sources is controlled together to output the driver's requested torque plus the intervention torque as a final requested torque on the basis of a current driving mode which is maintained as a driving mode just before the torque intervention is requested.

When the current driving mode is an electric variable transmission (EVT) mode, the control step is performed by determining an output for which the engine is responsible using a sum of a driver's requested torque plus an intervention torque as the final requested torque, a wheel speed, and an output that reflects state of charge (SOC) of a battery. The engine speed and an engine output torque are determined as a function of a relationship between the output for which the engine is responsible and the vehicle speed. The torque for controlling the determined engine speed and a reaction torque of the engine output torque are added to determine the output torque of the first motor generator. The output torque of the second motor generator is determined to prevent the sum of the engine output torque and the output torque of the second motor generator from exceeding the final requested torque.

The output for which the engine is responsible of the control step is determined on the basis of the final requested output and an SOC state after the final requested torque is calculated from the final requested torque and the wheel speed.

When the current driving mode is an electric vehicle (EV) mode, the control step is performed in which the second motor generator is determined to output the final requested torque as the sum of the driver's requested torque and the intervention torque while the output torque of the first motor generator is set to be 0 Nm.

When the current driving mode is the EV mode, the control step is performed in such a manner that the intervention torque is allotted to the first motor generator and the second motor generator according to a torque partition ratio between the first motor generator and the second motor generator, through both of which the driver's requested torque is output, in which respective output torques of the first motor generator and the second motor generator are determined.

When the current driving mode is an overdrive (OD) mode, the control step is performed in which an output value reflecting the driver's requested torque, the vehicle speed, and the SOC of the battery is allotted to an engine output torque, for which the engine and the second motor generator are responsible, and to the output torque of the second motor generator. Whether the allotted maximum output torque of the second motor generator controls the intervention torque is determined, and depending on the decision result, the output torque of the second generator and the engine output torque are controlled to control the intervention torque.

When the allotted maximum output of the second motor generator controls the intervention torque, the engine is controlled to output the allotted engine output torque while the second motor generator is controlled to output the sum of the output torque of the second motor generator plus the intervention torque.

When the maximum output torque of the second motor generator is unable to control the intervention torque, the second generator is controlled to output its allotted maximum torque, thereby controlling part of the intervention torque while the engine output is controllably reduced to control the remaining intervention torque.

When the absolute value of the remaining intervention torque, which is not controlled by the maximum output torque of the second motor generator, exceeds the engine output torque, engine fuel cut-off is performed.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

A method for controlling torque intervention in a hybrid vehicle in accordance with an exemplary embodiment of the present inventive concept will be described in detail in conjunction with the accompanying drawing.

Figure 3:
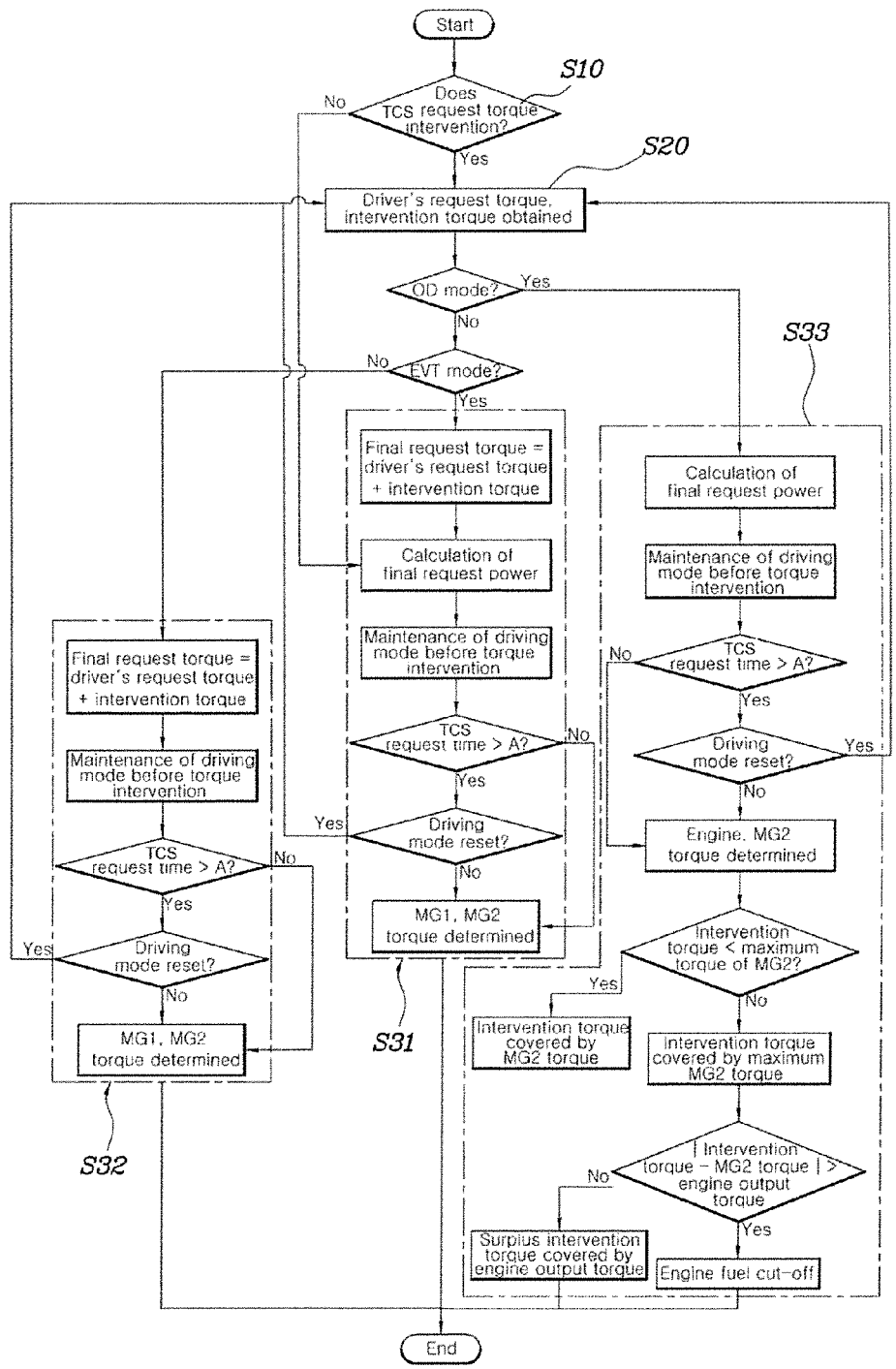
FIG. 3 is a view illustrating a control flow for torque intervention in a hybrid vehicle in accordance with the present disclosure.

Referring to FIG. 3, a method for controlling torque intervention of a hybrid vehicle according to the present disclosure comprises a determination step (S10), a decision step (S20), and a control step (S30).

In the determination step (S10), a determination is made to determine whether the torque intervention for controlling a driving force of the vehicle is requested. For example, the request for the torque intervention may be made by traction control system (TCS).

In the decision step (S20), upon the determination made in the determination step (S10), a final requested torque may be decided by combining an intervention torque required for the torque intervention and a torque requested by a driver. For example, the driver's requested torque can be calculated based on the amount of an accelerator and a brake pedal pressed by the driver.

In the control step (S30), when a torque intervention request time during which the torque intervention is requested is below a reference time, individual driving sources are controlled to output the driver's requested torque and the intervention torque as the final requested torque while a current driving mode is maintained as a driving mode just before the torque intervention is requested.

Figure 1:
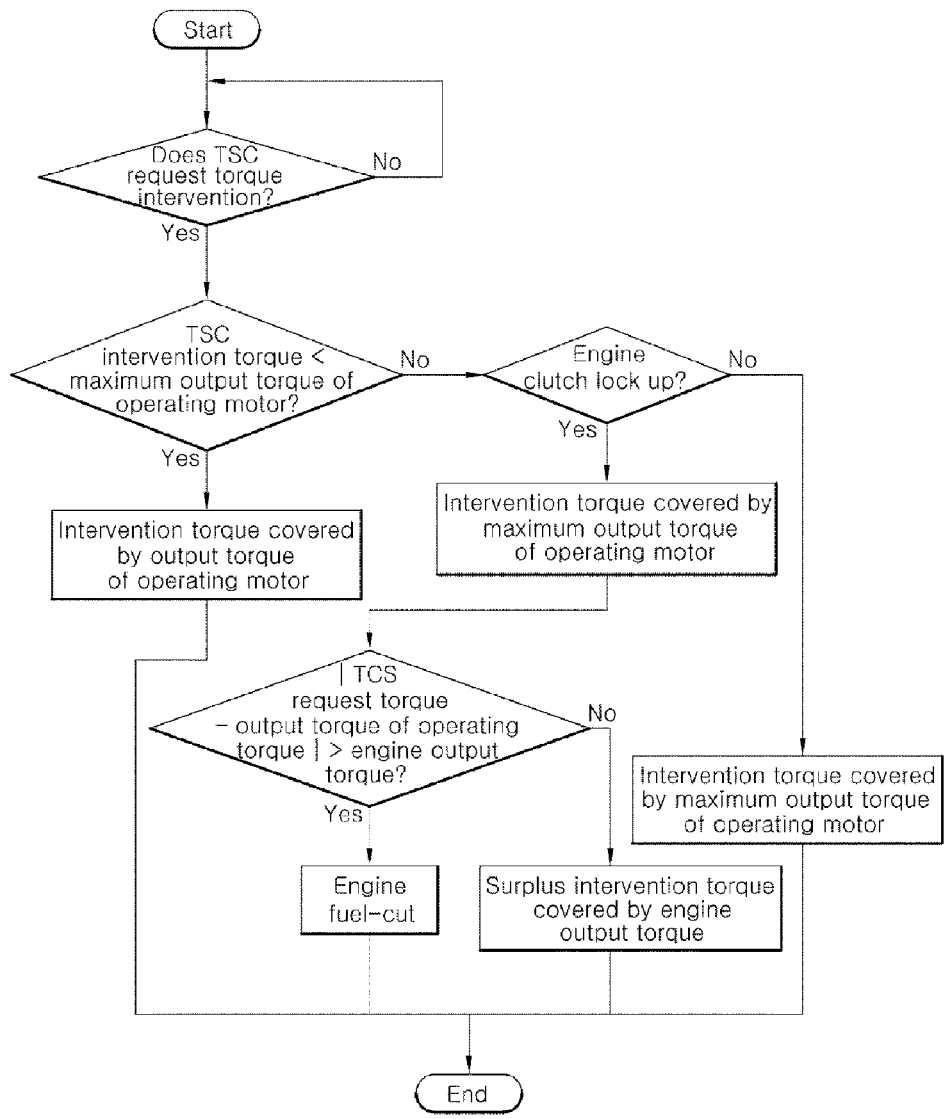
FIG. 1 is a view illustrating a control flow upon torque intervention of a traction control system (TCS) in a transmission mounted electric device (TMED)-type hybrid vehicle according to the related art.
Figure 2:
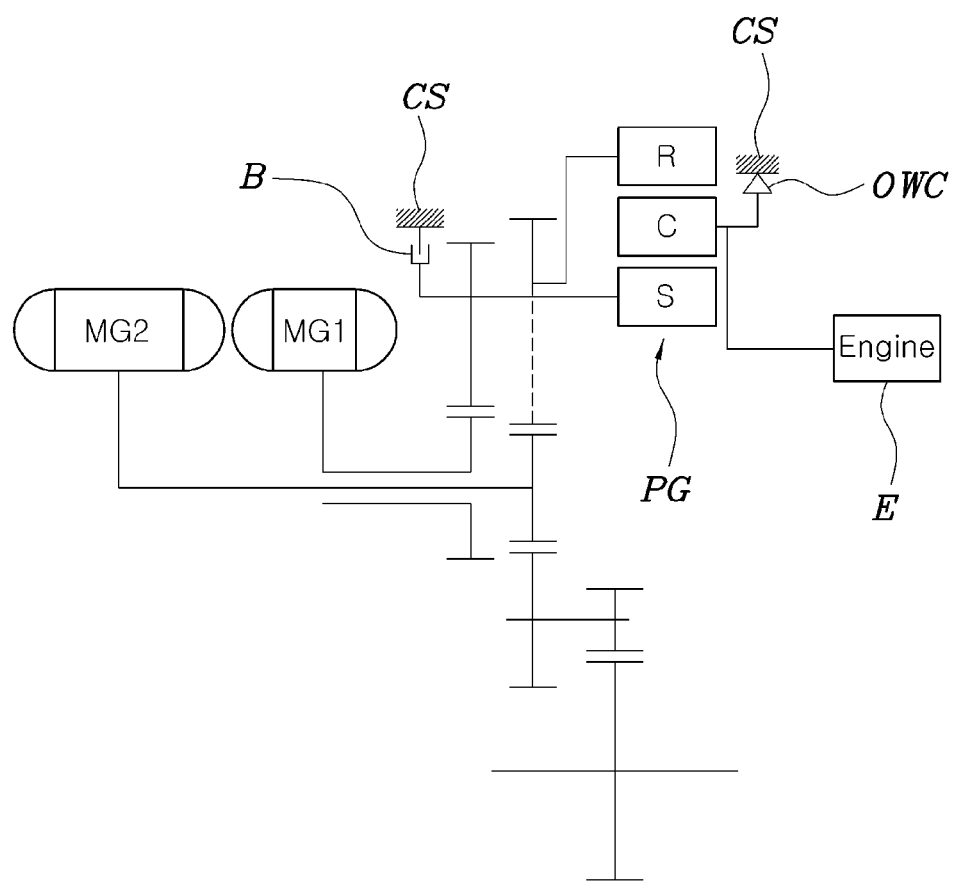
FIG. 2 is a view illustrating a configuration of a power-split-parallel hybrid vehicle according to the related art.

The method of present disclosure may be applied to the conventional hybrid vehicle shown in FIG. 2. The driving mode may be classified into an electric variable transmission (EVT) mode, in which an engine (E) power controls both vehicle driving and electric generation while a motor power controls the vehicle driving, an electric vehicle (EV) mode, in which the vehicle driving is performed with the motor power alone, and an over drive (OD) mode, in which the vehicle driving is performed by combination of the engine power and the motor power.

When the torque intervention is requested, the vehicle driving mode is determined as one of the EVT, EV, and OD modes by incorporating the intervention torque into the driver's requested torque, and output torques of an engine (E), a first motor generator (MG1), and a second motor generator (MG2) are determined to allow the vehicle to run according to the determined driving mode. The determined torques of the engine (E) and the motor generators (MG1, MG 2) are transmitted to an engine management system EMS (or engine control unit, ECU) and a motor control unit (MCU), respectively, and an output control is performed through a hybrid control unit (HCU).

Since the torque intervention request of the TCS is transmitted in a short period of time, the driving mode is controlled to remain as the driving mode just before the torque intervention is requested. That is, when the torque intervention request time is relatively short and the driving mode just before the request is the EVT mode, the driving mode is controlled to remain in the EVT mode.

When the torque intervention request time exceeds the reference time, the current driving mode is converted into a driving mode corresponding to the final requested torque while each driving source is controlled to output the final requested torque on the basis of the current driving mode.

That is, when the torque intervention request time exceeds the reference time, the current driving mode may change into a driving mode suitable for the final requested torque which includes the intervention torque.

With reference to FIG. 2, the hybrid vehicle comprises a planetary gear set (PG) composed of a sun gear (S), a carrier (C), and a ring gear (R), which are rotatable together as a first, a second, and a third rotating element, respectively. The first rotating element functions as a selective fixing element connected with a first motor generator (MG1). In this regard, a friction element operating as a selective fixing element may be a brake (B) connected to a transmission case (CS).

The second rotating element is connected to the engine (E) and rotates only in one direction. For example, the engine (E) and the second rotating element may be connected to the transmission case (CS) via a one way clutch (OWC) in order to rotate the second rotating element in a single direction.

The third rotating element may be connected to a second motor generator (MG2) and to an output shaft.

Figure 4:
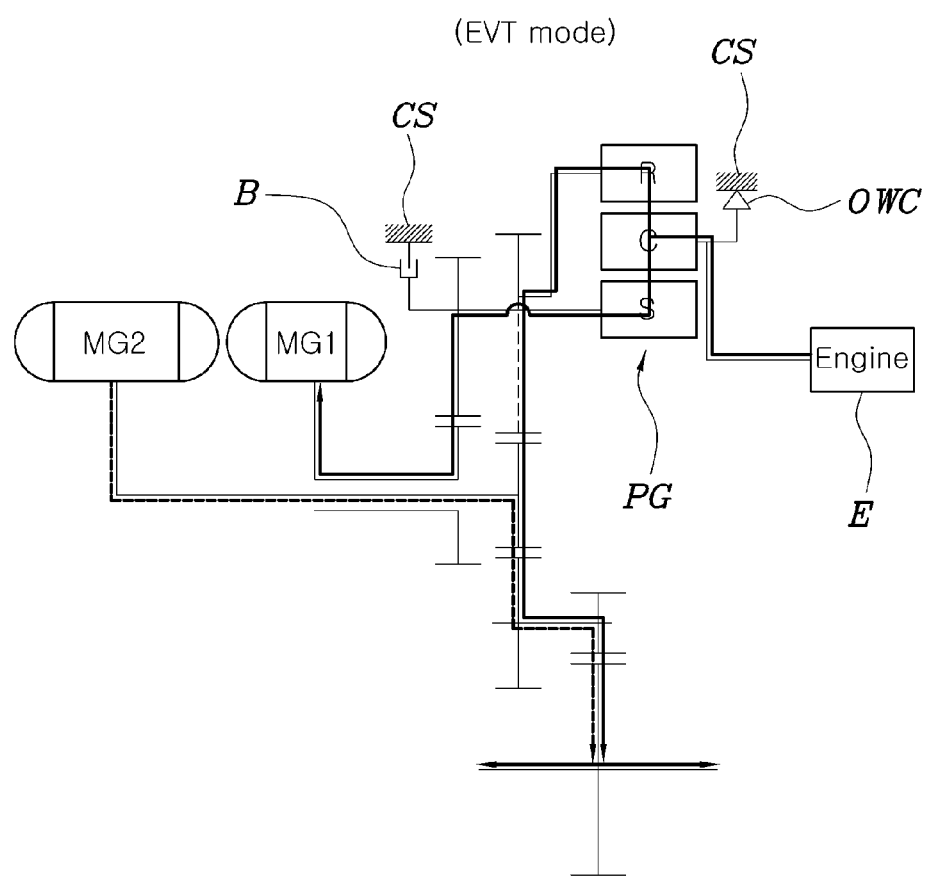
FIG. 4 is a power flow for an electric variable transmission (EVT) mode in a hybrid vehicle in accordance with the present disclosure.

When the current driving mode is determined to be the EVT mode upon the torque intervention request, a power may flow as shown in FIG. 4, and the output torques of the engine (E), the first motor generator (MG1), and the second motor generator (MG2) may be controlled to be suitable for the EVT mode.

Referring to FIGS. 3 and 4, controlling of the output torque in the EVT mode (S31) will be described in detail. An engine output for which the engine (E) is responsible can be determined using the sum of the driver's requested torque and the intervention torque, which is the final requested torque, a wheel speed, and an output torque which reflects an state of charge (SOC) of a battery.

For instance, a final requested output may be calculated from the final requested torque and the wheel speed, and the output for which the engine (E) is responsible can be determined on the basis of the final requested output, a state of charge (SOC) of a battery, etc.

The driver's requested torque and the final requested torque are calculated on the basis of vehicle wheels, and the final requested output can be calculated by multiplying the final requested torque by the current vehicle wheel speed.

For the calculation of the final requested torque and the final requested output requiring the torque intervention, the torque intervention request allows a larger slope than general driving conditions when the torque intervention is not requested, thereby improving responsiveness to the intervention torque.

An engine speed and an engine output torque are determined as a function of the relationship between the output for which the engine is responsible and the vehicle speed. That is, the engine speed at which the efficiency of the engine (E) is the highest can be determined on the basis of the current vehicle speed and the engine output, and consequently, the engine output torque can be determined.

The output torque of the first motor generator (MG1) can be determined by adding a torque for controlling the determined engine speed plus a reaction torque of the engine output torque. That is, the engine speed at which the engine (E) is the most efficient under the engine output and the engine output torque can be determined by controlling the output torque of the first motor generator (MG1).

A load leveling control may be performed to determine the output torque of the second motor generator (MG2) so that the sum of the engine output torque and the output torque of the second motor generator (MG2) does not exceed the final requested torque. Accordingly, the torque intervention in the power split-parallel hybrid vehicle can also be controlled in the EVT mode without negatively affecting operation in the vehicle.

Figure 5:
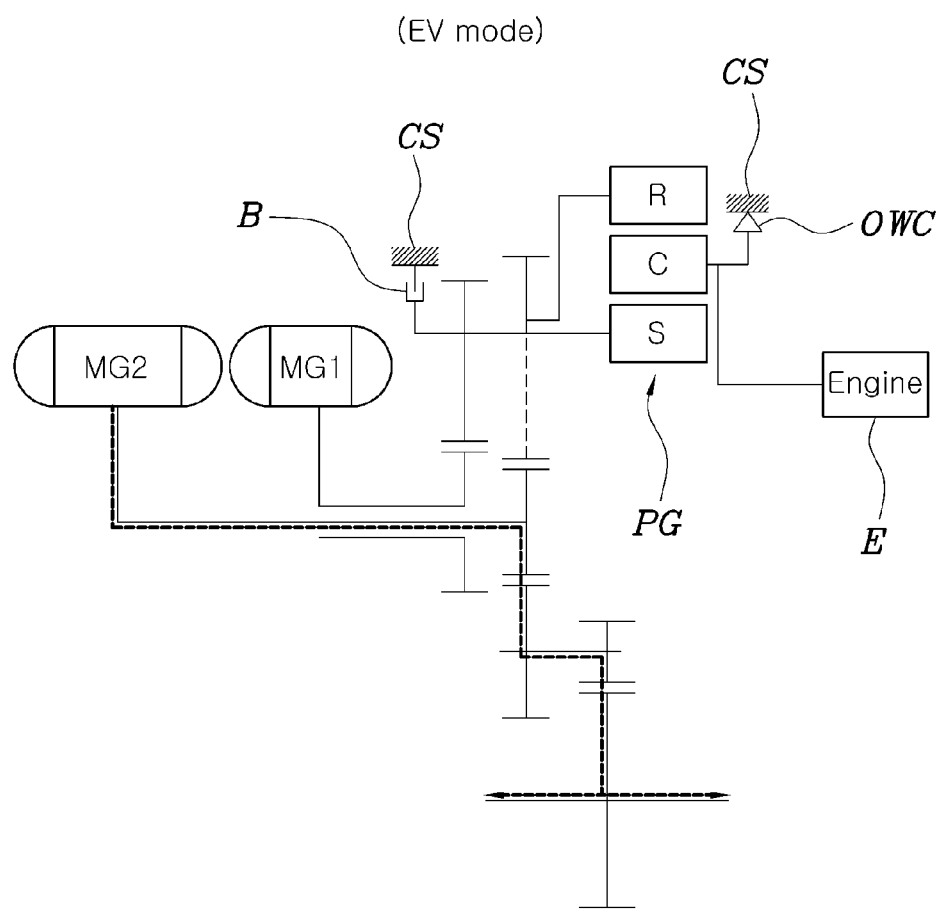
FIG. 5 is a power flow for an electric vehicle (EV) mode in a hybrid vehicle in accordance with the present disclosure.

When the current driving mode is determined to be the EV mode, a power flows as shown in FIGS. 4 and 5 and respective output torques of the first motor generator (MG1) and the second motor generator (MG2) may be determined to be suitable for use in the EV mode.

FIG. 5 illustrates an EV mode in which a vehicle is driven only by an output of the second motor generator (MG2). Determining and controlling of the output torque for the EV mode (S32) will be explained with reference to FIGS. 3 and 5 in detail. An output torque of the second motor generator (MG2) can be determined as the final requested torque, which is the sum of the driver's requested torque and the intervention torque while the output torque of the first motor generator (MG1) is set to be 0 Nm.

That is, the final requested torque determined by adding the driver's requested torque and the intervention torque can be controlled with the output torque of the second motor generator (MG2) alone.

Figure 6:
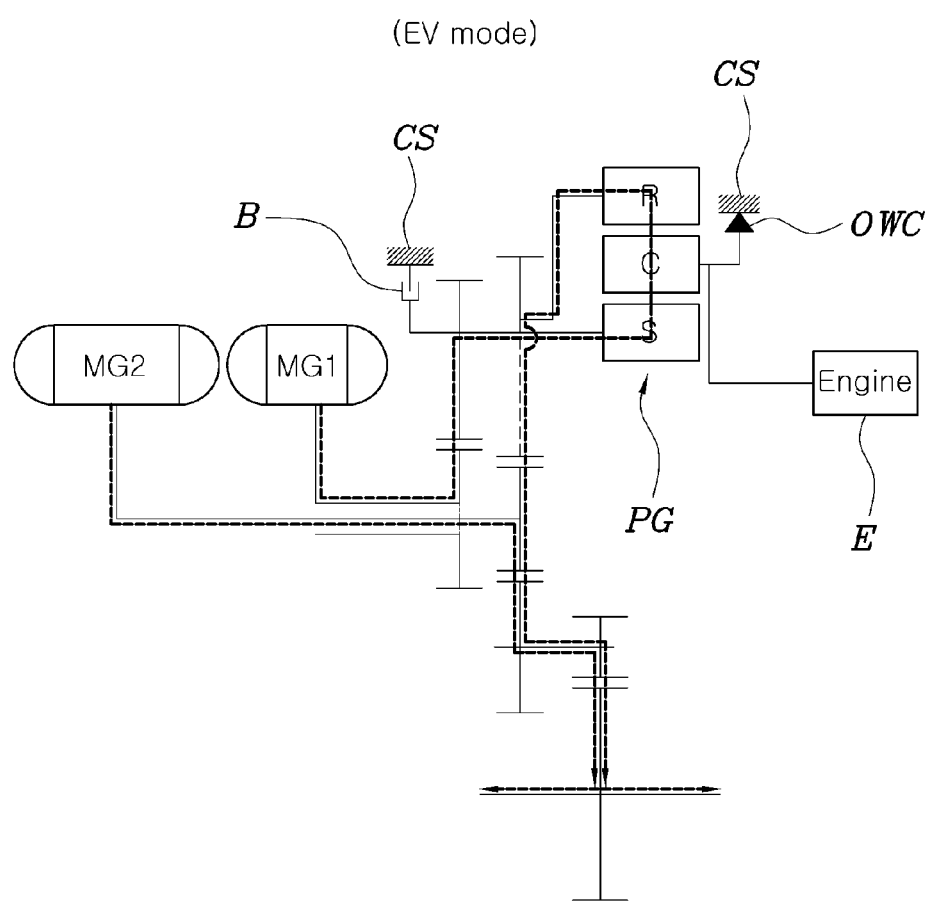
FIG. 6 is another power flow for the EV mode in a hybrid vehicle in accordance with the present disclosure.

FIG. 6 shows an EV mode in which a vehicle is driven by outputs of the first motor generator (MG1) and the second motor generator (MG2) in combination. Determining and controlling of an output torque for the EV mode (S32) will be explained with reference to FIGS. 3 and 6 in detail. When a torque partition ratio between the first motor generator (MG1) and the second motor generator (MG2) is determined, an intervention torque is allotted to the first motor generator (MG1) and the second motor generator (MG2) according to the torque partition ratio in which a driver's requested torque is output through the first motor generator MG1 and the second motor generator MG2, whereby respective output torques of the first motor generator (MG1) and the second motor generator (MG2) can be determined.

That is, the output torques of the first motor generator (MG1) and the second motor generator (MG2) control the sum of the driver's requested torque and the intervention torque.

In the power split-parallel hybrid vehicle according to the present disclosure, the torque intervention can be controlled in the EVT mode without negatively affecting operation of the vehicle.

Figure 7:
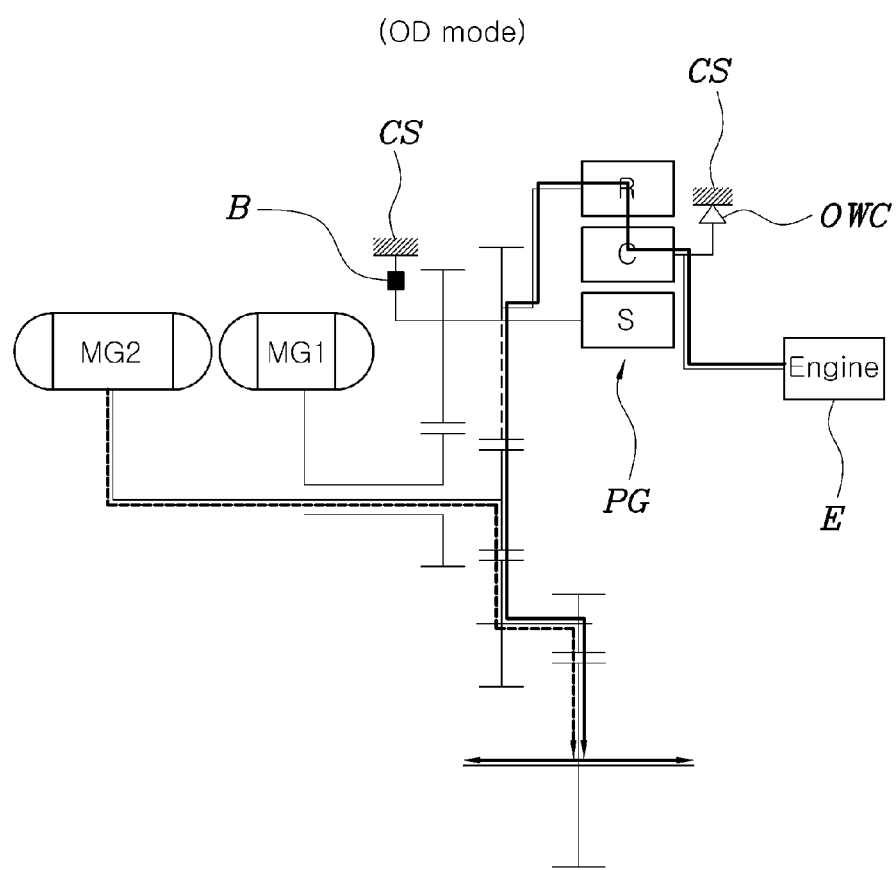
FIG. 7 is a power flow for an overdrive (OD) mode in a hybrid vehicle in accordance with the present disclosure.

When the current driving mode is determined to be the OD mode, a power flows as shown in FIG. 7 and respective output torques of the engine (E), the first motor generator (MG1), and the second motor generator (MG2) may be determined to be suitable for use in the OD mode.

With reference to FIGS. 3 and 7, determining and controlling of the output torque for the OD mode (S33) will be explained. An output value reflecting a driver's requested torque, a vehicle speed, and the SOC of a battery can be allotted to the engine output torque, for which the engine (E) and the second motor generator (MG2) are responsible, and the output torque of the second motor generator (MG2).

For instance, the driver's requested torque is calculated from data of the driver's requested torque and the wheel speed, and the engine output torque allotted to the engine (E) can be determined on the basis of the driver's torque request, an SOC state, an electric field load of the vehicle, etc.

That is, the driver's requested torque is a torque requested on the basis of the current wheel speed of the vehicle, and can be calculated by multiplying the driver's requested torque by the current wheal speed of the vehicle.

Next, the engine speed and the engine output torque are determined as a function of relationship between the output for which the engine is responsible and the vehicle speed. That is, the engine speed at which efficiency of the engine (E) is the highest can be determined on the basis of the current vehicle speed and the engine output. Accordingly, the engine output torque can be determined. The output torque of the second motor generator (MG2) is allotted and determined so as to control the driver's requested torque.

Thereafter, a decision is made to determine whether the allotted maximum output torque of the second motor generator (MG2) controls the intervention torque. Depending on the decision result, the output torque of the second generator (MG2) and the engine output torque may be controlled to carry out the intervention torque.

For example, when the allotted maximum torque of the second motor generator (MG2) is determined to control the intervention torque, the engine (E) is controlled to output the allotted engine output torque while the second motor generator (MG2) is controlled to output the sum of the output torque of the second motor generator (MG2) and the intervention torque.

When the maximum output torque of the second motor generator (MG2) is determined to be unable to control the intervention torque, the second generator (MG2) is controlled to output its allotted maximum torque, thereby controlling part of the intervention torque while reducing the engine output to control the remaining intervention torque. In addition, when the absolute value of the remaining intervention torque, which is not controlled by the maximum output torque of the second motor generator (MG2), exceeds the engine output torque, engine fuel cut-off may be performed. Upon a request for torque intervention in a power split-parallel hybrid vehicle, as described above, respective output torques of the engine, the first motor generator, and the second motor generator can be suitably allotted to control the torque intervention, irrespective of the current driving mode, without affecting operability of the vehicle.

Upon a request for torque intervention in a power split-parallel hybrid vehicle, as described above, the method of the present disclosure can control the torque intervention without affecting operability of the vehicle.

Although the exemplary embodiments of the present inventive concept have been disclosed for illustrative purposes, those skilled in the art will appreciate that various modifications, additions, and substitutions are possible, without departing from the scope and spirit of the invention as disclosed in the accompanying claims.

What is claimed is:

1. A method for controlling driving sources in a hybrid vehicle, wherein the hybrid vehicle includes a planetary gear set composed of a first, a second, and a third rotating element, the first rotating element functions as a selective fixing element connected with a first motor generator, the second rotating element is connected to an engine and rotates only in one direction, and the third rotating element is connected to a second motor generator and an output shaft, the method comprising:
    a determination step for determining whether a torque intervention is requested by a traction control system (TCS);
    a decision step for determining, when the torque intervention is requested, a driver's requested torque and an intervention torque for the torque intervention; and
    a control step for controlling, when a torque intervention request time during which the torque intervention is requested is below a reference time, each of the driving sources to output the driver's requested torque and the intervention torque as a final requested torque on a basis of a current driving mode while the current driving mode is maintained as a driving mode just before the torque intervention is requested,
    wherein the driving mode is one of an electric variable transmission (EVT) mode, an electric vehicle (EV) mode, and an overdrive (OD) mode,
    wherein in the control step, when the torque intervention request time exceeds the reference time, the current driving mode is changed to a driving mode corresponding to the final requested torque while each of the driving sources are controlled to output the final requested torque on the basis of the current driving mode.

2. The method of claim 1, wherein, when the current driving mode is the EVT mode, the control step comprises:
    determining an output for which the engine is responsible using a sum of the driver's requested torque and the intervention torque as the final requested torque, a wheel speed, and an output that reflects state of charge (SOC) of a battery;
    determining an engine speed and an engine output torque as a function of the relationship between the output for which the engine is responsible and a vehicle speed;
    adding a torque for controlling the determined engine speed plus a reaction torque of the engine output torque to determine an output torque of the first motor generator; and
    determining an output torque of the second motor generator to prevent a sum of the engine output torque and the output torque of the second motor generator from exceeding the final requested torque.

3. The method of claim 2, wherein the output for which the engine is responsible is determined on the basis of a final requested output and the SOC after the final requested output is calculated from the final requested torque and the wheel speed.

4. The method of claim 1, wherein when the current driving mode is the EV mode, the control step is performed in which the second motor generator is determined to output the final requested torque as a sum of the driver's requested torque and the intervention torque while the output torque of the first motor generator is set to be 0 Nm.

5. The method of claim 1, wherein when the current driving mode is the EV mode, the control step is performed in which the intervention torque is allotted to the first motor generator and the second motor generator according to a torque partition ratio between the first motor generator and the second motor generator, through both of which the driver's requested torque is output, so that respective output torques of the first motor generator and the second motor generator are determined.

6. The method of claim 1, wherein when the current driving mode is the OD mode, the control step is performed in which:
an output value reflecting the driver's requested torque, a vehicle speed, and an electric state of the vehicle is allotted to an engine output torque for which the engine and the second motor generator are responsible, and to an output torque of the second motor generator; and
whether the allotted maximum output torque of the second motor generator controls the intervention torque is determined, and depending on the determination result, the output torque of the second generator and the engine output torque are controlled to control the intervention torque.

7. The method of claim 6, wherein when the allotted maximum output of the second motor generator controls the intervention torque, the engine is controlled to output the allotted engine output torque while the second motor generator is controlled to output a sum of the output torque of the second motor generator and the intervention torque.

8. The method of claim 6, wherein when the maximum output torque of the second motor generator is determined to be unable to control the intervention torque, the second generator is controlled to output its allotted maximum torque, thereby controlling a part of the intervention torque while the engine output is controllably reduced to control a remaining part of the intervention torque.

9. The method of claim 7, wherein when an absolute value of the remaining intervention torque, which is not controlled by the maximum output torque of the second motor generator, exceeds the engine output torque, engine fuel cut-off is performed.

* * * * *